United States Patent
Fujikura et al.

(10) Patent No.: US 8,664,312 B2
(45) Date of Patent: Mar. 4, 2014

(54) RUBBER COMPOSITION FOR TIRE, AND PNEUMATIC TIRE

(71) Applicant: Sumitomo Rubber Industries, Ltd., Kobe (JP)

(72) Inventors: Keitarou Fujikura, Kobe (JP); Yuka Yokoyama, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 0 days.

(21) Appl. No.: 13/713,106

(22) Filed: Dec. 13, 2012

(65) Prior Publication Data

US 2013/0158190 A1  Jun. 20, 2013

(30) Foreign Application Priority Data

Dec. 16, 2011  (JP) .................................. 2011-276252
Jul. 23, 2012  (JP) .................................. 2012-163053

(51) Int. Cl.
C08L 91/06 (2006.01)
B60C 1/00 (2006.01)
C08L 9/00 (2006.01)

(52) U.S. Cl.
USPC ............................ 524/275; 524/277; 524/571

(58) Field of Classification Search
USPC .......................................... 524/275, 277, 571
See application file for complete search history.

(56) References Cited

U.S. PATENT DOCUMENTS

2010/0163150 A1* 7/2010 Hirayama et al. ............ 152/532

FOREIGN PATENT DOCUMENTS

| JP | 2008-297392 A | 12/2008 |
| JP | 2008-303249 A | 12/2008 |
| JP | 2011-80022 A | 4/2011 |
| WO | WO 2008149588 A1 * | 12/2008 |

* cited by examiner

Primary Examiner — Ling Choi
Assistant Examiner — Ronald Grinsted
(74) Attorney, Agent, or Firm — Birch, Stewart, Kolasch & Birch, LLP

(57) ABSTRACT

The present invention provides a rubber composition for a tire which makes it possible to maintain weather resistance for a long time without damaging the appearance of tires and to reduce the use of petroleum resources, and whose raw materials are easily obtainable; and also provides a pneumatic tire formed from the rubber composition. The present invention relates to a rubber composition for a tire, including a rubber component and a microalgae-derived natural wax.

11 Claims, No Drawings

RUBBER COMPOSITION FOR TIRE, AND PNEUMATIC TIRE

TECHNICAL FIELD

The present invention relates to a rubber composition for a tire, and a pneumatic tire formed from the rubber composition.

BACKGROUND ART

There is a need for rubber compositions, particularly rubber compositions used for tires, to have weather resistance (ozone resistance), in other words, it is needed to prevent cracking and deterioration of the rubber composition caused by atmospheric ozone. For this reason, wax is added to such rubber compositions.

Paraffin wax has been mainly used as wax to be added to rubber compositions. However, this is not preferred in view of the global environment because paraffin wax is synthesized from petroleum which is a fossil resource. In addition, while petroleum wax has excellent weather resistance, it unfortunately damages the aesthetic qualities (the appearance of tires) by discoloration caused by blooming. Further, because petroleum wax has a low polarity, when it is used in a large amount in recent fuel-economy compounds, such as silica rubber compounds, it unfortunately leads to poor fuel economy.

Hence, exemplary rubber compounds in which naturally occurring wax, such as carnauba wax, jojoba wax and rice bran wax, is used have recently been suggested (for example, Patent Literatures 1 and 2).

However, although the use of a wax having a broad carbon number distribution ensures weather resistance in a wide temperature range, the carbon number distribution (molecular weight distribution), i.e., the softening point distribution, of natural waxes varies depending on the organisms from which the waxes are derived, and not many natural waxes contain components having a wide softening temperature range. Therefore, the use of natural waxes for tires has a problem in terms of weather resistance in a wide temperature range, particularly in a low-temperature region. Furthermore, these waxes contain an ester component as the main component, have a low hydrocarbon content, and thus have poor compatibility with a rubber component (for example, low polarity rubbers such as natural rubber, butadiene rubber, and isoprene rubber), compared with petroleum-derived waxes. This creates a problem that sufficient weather resistance cannot be obtained. In addition, natural waxes are made from plant resources such as trees. This also creates problems in terms of availability and cost, i.e., productivity depends on the weather, and labor cost is high.

Meanwhile, an attempt has been made to use candelilla wax and carnauba wax in combination in order to enhance weather resistance (for example, Patent Literature 2). However, even with the use of both natural waxes, weather resistance (particularly at low temperatures) and measures against discoloration are insufficient, and an improvement has thus been desired.

Exemplary rubber compounds in which an isoprenoid extracted from, for example, plants, and the like are appropriately mixed to provide better properties are also suggested (for example, Patent Literature 3).

However, because the content of such isoprenoids in plants or microorganisms is very small, their mass production is difficult and no examples of practical applications have been reported. This shows that there have been problems in terms of availability and cost.

CITATION LIST

Patent Literature

Patent Literature 1: JP-A 2008-297392
Patent Literature 2: JP-A 2008-303249
Patent Literature 3: JP-A 2011-80022

SUMMARY OF INVENTION

Technical Problem

The present invention aims to solve the above problems, and to provide a rubber composition for a tire which makes it possible to maintain weather resistance for a long time without damaging the appearance of tires and to reduce the use of petroleum resources, and whose raw materials are easily obtainable; and also provide a pneumatic tire formed from the rubber composition.

Solution to Problem

The present invention relates to a rubber composition for a tire, including a rubber component and a microalgae-derived natural wax.

The microalga is preferably a microalga of the class Euglenophyceae.

The microalga is preferably a microalga of the genus *Euglena*.

The microalgae-derived natural wax is preferably a wax component purified from a culture of the microalga.

The microalgae-derived natural wax is preferably obtained by culturing the microalga under aerobic conditions and then under anaerobic conditions.

The present invention also relates to a pneumatic tire formed from the rubber composition.

Advantageous Effects of Invention

The present invention provides a rubber composition for a tire, including a rubber component and a microalgae-derived natural wax. With the use of the rubber composition, weather resistance can be maintained for a long time without damaging the appearance of tires. Further, because the natural wax is derived from microalgae, it is possible to reduce the use of petroleum resources, making the product environmentally friendly. Furthermore, its raw materials are easily obtainable because various microalgae live in ponds, lakes, brackish waters, seawater, and the like, and cultivation of various microalgae is also actively performed on an industrial scale. In addition, fuel economy can also be improved by the addition of a microalgae-derived natural wax.

DESCRIPTION OF EMBODIMENTS

According to the present invention, the rubber composition for a tire contains a rubber component and a microalgae-derived natural wax.

The present invention uses natural waxes that can be easily mass-produced at a low cost from microalgae living in ponds, lakes, brackish waters, seawater, or the like, using an industrial-scale culture tank, lake, pond or the like. These natural waxes are more advantageous than plant-derived waxes in terms of the cost and availability. Further, compared with plant-derived waxes, the natural waxes have better weather resistance and make it possible to maintain weather resistance for a long time without damaging the appearance of tires. This is presumably because since microalgae-derived natural waxes have a broad carbon number distribution, weather resistance can be achieved in a wide temperature range (even at low temperatures). According to the present invention, fuel economy can also be improved.

The materials usable as the rubber component in the present invention are not particularly limited. Examples thereof include natural rubber (NR), epoxidized natural rubber (ENR), and synthetic diene rubbers (isoprene rubber (IR), butadiene rubber (BR), styrene-butadiene rubber (SBR), styrene-isoprene-butadiene rubber (SIBR), chloroprene rubber (CR), acrylonitrile butadiene rubber (NBR), ethylene propylene diene rubber (EPDM), butyl rubber (IIR), halogenated butyl rubber (X-IIR), etc.). These as the rubber component may be used singly or as a combination of two or more thereof. Preferred among these are NR, ENR, BR, and SBR, with NR and BR being more preferred, because the properties required for each tire component can be easily secured with them.

With regard to synthetic diene rubbers, in view of possible depletion of petroleum resources in the future, it is preferable to use no synthetic diene rubber or to use synthetic diene rubbers that are prepared from renewable biological raw materials as monomers. One example of such synthetic diene rubbers made from biological raw materials is BR, which can be prepared by a method in which, for example, bioethanol is catalytically converted into butadiene and the resulting butadiene is polymerized.

When the rubber component includes BR, the BR content based on 100% by mass of the rubber component is preferably 30% by mass or more, and more preferably 40% by mass or more. A content of less than 30% by mass tends to lead to a decrease in abrasion resistance. The BR content is preferably 90% by mass or less, more preferably 85% by mass or less, and still more preferably 70% by mass or less. A content of more than 90% by mass may lead to poor processability.

No particular limitation is imposed on the NR. For example, the ones usually used in the tire industry, such as SIR20, RSS#3, and TSR20, can be used.

When the rubber component includes NR, the NR content based on 100% by mass of the rubber component is preferably 10% by mass or more, more preferably 15% by mass or more, and still more preferably 30% by mass or more. A content of less than 10% by mass tends to lead to poor processability and an increase in low-temperature brittle point. The NR content is preferably 70% by mass or less, and more preferably 60% by mass or less. A content of more than 70% by mass tends to lead to a decrease in abrasion resistance.

The ENR preferably has an epoxidation degree of 5 mol % or more, more preferably 10 mol % or more. ENR having an epoxidation degree of less than 5 mol % tends to have only a slight modifying effect on the rubber composition. Also, the epoxidation degree of ENR is preferably 80 mol % or less, and more preferably 60 mol % or less. ENR having an epoxidation degree of more than 80 mol % tends to cause gelation of the polymeric component.

When the rubber component includes ENR, the ENR content based on 100% by mass of the rubber component is preferably 10% by mass or more, and more preferably 15% by mass or more. A content of less than 10% by mass tends to lead to a decrease in processability. The ENR content is preferably 70% by mass or less, and more preferably 60% by mass or less. A content of more than 70% by mass tends to lead to a decrease in abrasion resistance.

The present invention uses microalgae-derived natural waxes, and thereby can provide a rubber composition for a tire which makes it possible to maintain weather resistance for a long time without damaging the appearance of tires and to reduce the use of petroleum resources, and whose raw materials are easily obtainable. According to the present invention, fuel economy can also be improved.

In the present invention, the microalgae-derived natural waxes mean aliphatic hydrocarbons produced by microalgae. No particular limitation is imposed on the aliphatic hydrocarbons as long as they are produced by microalgae. Examples thereof include saturated or unsaturated aliphatic hydrocarbons having a carbon number of 15 to 50, such as n-heptadecene; saturated or unsaturated fatty acids having a carbon number of 15 to 50, such as n-eicosadienoic acid; and saturated or unsaturated fatty acid esters having a carbon number of 15 to 50, such as methyl laurate, myristyl myristate, and methyl palmitate. Examples also include those obtained by altering the carbon number of these compounds by the fischer-tropsch process or the like and those obtained by saturating the double bonds of these compounds by hydrogenation. In particular, saturated or unsaturated fatty acid esters (particularly, esters of (higher) fatty acids and (higher) aliphatic alcohols) having a carbon number of 15 to 50 (preferably 15 to 40) are preferred.

The microalgae-derived natural wax preferably has a melting point of 40 to 120° C., more preferably 50 to 100° C., and still more preferably 60 to 90° C. With a melting point of less than 40° C., sufficient weather resistance may not be obtained at high temperatures. With a melting point of more than 120° C., wax blooming to the tire surface may be insufficient and sufficient weather resistance may thus not be obtained.

As used herein, the melting point is a peak temperature measured by differential scanning calorimetry (DSC). When there are multiple peaks, a peak temperature with the greatest heat of fusion ΔH (J/g) is regarded as a melting point.

No particular limitation is imposed on the microalgae as long as the microalgae have properties to convert some of the nutrients in the body into hydrocarbons (aliphatic hydrocarbons). Algae capable of utilizing carbon dioxide are preferred. Specific examples include microalgae of the class Euglenophyceae, microalgae of the genus *Chlorella*, microalgae of the genus *Scenedesmus*, microalgae of the genus *Desmodesmus*, microalgae of the genus *Spirulina*, microalgae of the genus *Arthrospira*, microalgae of the genus *Botryococcus* (particularly, *Botryococcus braunii*), and microalgae of the genus *Pseudochoricystis* (particularly, *Pseudochoricystis ellipsoidea*). These microalgae are known to be able to biosynthesize natural waxes (aliphatic hydrocarbons). In particular, microalgae of the class Euglenophyceae are preferred in terms of natural wax productivity.

Examples of the microalgae of the class Euglenophyceae include microalgae of genera such as *Euglena, Astasia, Khawkinea, Trachelomonas, Peranema, Phacus, Lepocinclis*, and *Strombomonas*. In particular, microalgae of the genus *Euglena* are preferred.

The reason is because of the following known facts: microalgae of the genus *Euglena* are easy to culture; they accumulate paramylon as a carbohydrate in their cells during culture under aerobic conditions, and the accumulated paramylon is then decomposed into waxes (esters of (higher) fatty acids and (higher) aliphatic alcohols) during subsequent culture under anaerobic conditions; and the waxes obtained by this production method have only a small number of unsaturated bonds (JP-A S59-118090). The reason is also because the present inventors have found that the effects of the present invention can be favorably achieved by adding such a wax to a rubber composition for a tire, and that the wax can be suitably used as a wax that is added to a rubber composition for a tire in order to enhance weather resistance.

Further, the microalgae of the genus *Euglena* are known to produce waxes (esters of (higher) fatty acids and (higher) aliphatic alcohols) with extremely high production efficiency reaching as high as 50% by mass of the dry cell mass (JP-A S59-118090), depending on the culture conditions. Thus, the waxes derived from such microalgae are also superior to other naturally occurring waxes, in terms of production efficiency.

The microalgae of the genus *Euglena* are a group of flagellates which zoologically belong to the order Euglenales and botanically belong to the class Euglenophyceae, order Euglenales. These microalgae naturally inhabit natural bodies of water such as ponds and lakes and thus they can be easily collected and cultured. Typical examples include, but are not limited to, *Euglena gracilis Z, Euglena gracilis* var. *bacillaris, Euglena viridis*, and *Astasia longa*. Various mutants obtained by treating them with known methods can also be used.

Known methods for culturing various microorganisms are applicable to the culture of microalgae. Specifically, a medium to which adequate amounts of a carbon source, nitrogen source, inorganic salts, and vitamins are added can be used. Non-limiting examples of usable known media include Koren-Hutner medium (Korren and Hutner, J. Protozool. 14, Supple. 17 (1967)), Hutner medium (Hutner, J. Protozool. 6, 23 (1959)), and Cramer-Myers medium (Cramer and Myers, Arch. Mikrobiol, 17, 384, (1952)).

Further, culture of microalgae and extraction of natural waxes from the microalgae can be carried out based on known methods such as those described in detail in, for example, a book of Kitaoka et al. (entitled "*Euglena*" edited by Shosaburo Kitaoka, Gakkai Shuppan Center (1989)), and "CHEMISTRY & CHEMICAL INDUSTRY" (Michiko Taniguchi, vol. 52, 262 (1999)). Further, among the above-described microalgae, microalgae of the genera *Euglena, Chlorella, Spirulina*, and *Arthrospira*, and the like have already been cultured on an industrial scale.

Preferred examples of the carbon source include glucose, starch hydrolysates, molasses, glutamic acid, acetic acid, and ethanol. Two or more kinds of them may be used in combination.

Preferred examples of the nitrogen source include ammonia, ammonium salts, glutamic acid, and aspartic acid. Two or more kinds of them may be used in combination. Further, the mass ratio of the carbon source to the nitrogen source (C/N) is preferably 4 to 30.

As for the inorganic salts, it is preferable that inorganic salts containing calcium, magnesium, manganese, iron and the like be used in combination.

As for the vitamins, it is preferable that vitamin $B_1$, vitamin $B_{12}$, vitamin $B_{16}$, and the like be used in combination.

The culture temperature is preferably 20 to 35° C., and more preferably 27 to 33° C. Although culture can be carried out either at a temperature below 20° C. or above 35° C., the growth tends to be slow and the wax production efficiency tends to be poor.

Culture may be carried out in a dark place or in a light place. Specifically, the microalgae may be exposed to light or may be in the dark or under indoor light.

In the case of culturing the microalgae in a liquid or suspension, it is desirable to appropriately shake or stir the medium. Further, culture is desirably carried out under aerobic conditions, and an aeration of 0.4 to 2 L per minute per liter of culture is desirable for growth of the microalgae.

Further, as disclosed in JP-A S59-118090, in order to facilitate the conversion of paramylon to wax, it is desirable to culture microalgae of the genus *Euglena* under aerobic conditions for a certain period of time to accumulate paramylon in their cells, and then transfer the culture to anaerobic conditions to produce waxes (esters of (higher) fatty acids and (higher) aliphatic alcohols). In this case, the microalgae are desirably cultured under aerobic conditions for 4 to 7 days until they reach the stationary phase of growth, followed by transfer to anaerobic conditions and culture for 1 to 3 days. In this way, a large amount of wax can be efficiently produced.

Examples of the method for transfer to anaerobic conditions include a method in which cells cultured under aerobic conditions are collected by centrifugation or the like, the collected cells are then suspended in a solution such as phosphate buffer, and nitrogen gas is passed through the solution.

Further, the waxes (esters of (higher) fatty acids and (higher) aliphatic alcohols) tend to have a lower melting point as the fatty acid and aliphatic alcohol components have less carbon atoms or as the degree of unsaturation increases. Therefore, as disclosed in JP-A S61-254193, it is possible to control the melting point of the wax to be produced according to the particular purpose, by adding a fatty acid during the culture of the microalgae.

Accordingly, in addition to the above-described additives, a fatty acid may be added in order to produce a wax having a specific composition (for example, a wax having a specific number of carbon atoms, and a wax having a specific number of unsaturated bonds). The timing of adding a fatty acid is not particularly limited. However, in the case where the obtained wax is added to a rubber composition for a tire in order to enhance weather resistance, as in the present invention, a fatty acid is preferably not added to the culture because waxes having a small number of unsaturated bonds (i.e., fatty acid esters in a solid form at 25° C.) can be obtained by culturing microalgae of the genus *Euglena* in a conventional medium (medium without fatty acid supplementation).

The fatty acid preferably has 8 to 40 carbon atoms, more preferably 10 to 20 carbon atoms, in view of a desirable melting point range of the wax to be produced (for example, fatty acid ester).

No particular limitation is imposed on the fatty acid. Examples thereof include unsaturated fatty acids such as myristoleic acid, palmitoleic acid, oleic acid, elaidic acid, linoleic acid, linolenic acid, gadoleic acid, gondoic acid, cetoleic acid, and erucic acid; and saturated fatty acids such as lauric acid, myristic acid, palmitic acid, and stearic acid. These acids may be used singly or as a combination or two or more thereof.

Any known method may be used as the method for purifying a wax component from the microalgal culture (cells). Examples thereof include a method involving collecting cells from a culture by filtration and/or centrifugation, and then extracting a wax component into an organic solvent; a method involving disrupting cells by sonication or the like, and then separating a wax component by centrifugation; and a method involving disrupting cells by sonication or the like, and then extracting a wax component into an organic solvent. A wax component may be further purified by column chromatography or the like.

The wax component thus purified is mixed with a rubber component and other ingredients, thereby giving a rubber composition for a tire that suitably achieves the effects of the present invention.

The amount of the microalgae-derived natural wax is preferably 1 part by mass or more, and more preferably 2 parts by mass or more, per 100 parts by mass of the rubber component. With an amount of less than 1 part by mass, it may not be possible to enhance weather resistance sufficiently. The amount is preferably 100 parts by mass or less, more preferably 30 parts by mass or less, still more preferably 20 parts by mass or less, and particularly preferably 10 parts by mass or less. With an amount of more than 100 parts by mass, the tensile strength at break and the rigidity of the rubber composition tend to be reduced.

Together with the microalgae-derived natural wax, other naturally occurring waxes may be appropriately added. Examples include natural waxes having a high ratio of polar groups (such as ester groups, ketone groups, or the like), such as carnauba wax, beeswax, and rice wax; natural waxes having a relatively high hydrocarbon content, such as candelilla wax; and natural waxes having a high branched hydrocarbon content, such as natural isoprenoids having 20 to 60 carbon atoms and/or hydrogenated products thereof. Further, petroleum wax may be added together with the microalgae-derived natural wax. In particular, natural waxes having a high ratio of polar groups are preferred, with carnauba wax being more preferred, because when combined with the microalgae-derived natural wax, these waxes can synergistically enhance weather resistance.

In the present invention, even in the case where other naturally occurring waxes are added together with the microalgae-derived natural wax, the total wax content is preferably in the above-described range as in the case where the microalgae-derived natural wax alone is added.

Further, in terms of being more advantageous to weather resistance, it is preferable that the following formula be satisfied: [the amount of microalgae-derived natural wax]>[the amount of natural wax having a high ratio of polar groups (preferably, carnauba wax)]. Further, the difference in the amount (part(s) by weight) ([the amount of microalgae-derived natural wax]−[the amount of natural wax having a high ratio of polar groups (preferably, carnauba wax)]) is preferably 4 or more, and more preferably 10 or more.

The rubber composition of the present invention preferably contains filler. Any filler can be used without limitation as long as its use is known in the tire industry. The type of filler is not particularly limited. Examples thereof include silica, carbon black, aluminium hydroxide, clay, calcium carbonate, montmorillonite, cellulose, glass balloons, and various short fibers. Particularly preferred as the filler are silica, carbon black, and aluminium hydroxide, in terms of the properties of tires. They may be used singly or as a combination of two or more thereof.

The filler content is preferably 10 to 200 parts by mass, more preferably 20 to 180 parts by mass, and still more preferably 30 to 150 parts by mass, per 100 parts by mass of the rubber component. With a content of less than 10 parts by mass, the strength of the rubber composition tends to be insufficient. With a content of more than 200 parts by mass, the dispersion of filler in rubber tends to be insufficient, leading to a decrease in the properties of the rubber composition.

Among the above-listed fillers, silica is particularly preferably used in terms of enhancing the fuel economy of tires. The type of silica is not particularly limited. Any silica prepared by a wet or dry method can be used.

The silica preferably has a nitrogen adsorption specific surface area determined by the BET method of 50 $m^2/g$ or more, more preferably 100 $m^2/g$ or more. With an $N_2SA$ of less than 50 $m^2/g$, the rubber strength tends to be reduced. The nitrogen adsorption specific surface area of silica determined by the BET method is preferably 250 $m^2/g$ or less, and more preferably 200 $m^2/g$ or less. With an $N_2SA$ of more than 250 $m^2/g$, the processability tends to be poor. Determination of the nitrogen adsorption specific surface area of silica by the BET method can be carried out in accordance with ASTM D3037-81.

In the case where silica is used, the silica content is preferably 5 to 200 parts by mass, more preferably 15 to 150 parts by mass, and still more preferably 25 to 100 parts by mass, per 100 parts by mass of the rubber component. In this range, it is possible to secure the mechanical strength of the rubber composition while achieving good fuel economy, and also to achieve good weather resistance and good compatibility with the microalgae-derived natural wax.

In the case where silica is used, it is preferable that a silane coupling agent be added together with the silica. Any silane coupling agent that has been used in combination with silica in the rubber industry can be used. Examples thereof include sulfide silane coupling agents such as bis(3-triethoxysilylpropyl)disulfide and bis(3-triethoxysilylpropyl)tetrasulfide; mercapto silane coupling agents such as 3-mercaptopropyltrimethoxysilane; vinyl silane coupling agents such as vinyltriethoxysilane; amino silane coupling agents such as 3-aminopropyltriethoxysilane; glycidoxy silane coupling agents such as γ-glycidoxypropyltriethoxysilane; nitro silane coupling agents such as 3-nitropropyltrimethoxysilane; and chloro silane coupling agents such as 3-chloropropyltrimethoxysilane. Preferred among the examples are sulfide silane coupling agents, with bis(3-triethoxysilylpropyl)disulfide and bis(3-triethoxysilylpropyl)tetrasulfide being more preferred. The silane coupling agent content is preferably 5 to 15 parts by mass per 100 parts by mass of silica.

In addition to silica, carbon black may also be used as a reinforcing agent, if desired. However, in view of possible depletion of petroleum resources in the future, it is preferable to use no carbon black or to use carbon black that is prepared from renewable biological raw materials. In the case where carbon black is used, the carbon black content is preferably 1 to 10 parts by mass per 100 parts by mass of the rubber component. In this range, it is possible to secure the mechanical strength of the rubber composition and to achieve good weather resistance and good compatibility with the microalgae-derived natural wax.

In addition to the above-described ingredients, compounding agents usually used in the production of rubber compositions may be appropriately added into the rubber composition of the present invention. Examples include reinforcing fillers such as clay, zinc oxide, stearic acid, processing aids, various antioxidants, softeners, plasticizers, tackifiers, vulcanizing agents such as sulfur, and vulcanization accelerators.

The rubber composition of the present invention can be prepared by an ordinary method. Specifically, the rubber composition can be prepared by, for example, a method in which the ingredients described above are mixed by a Banbury mixer, a kneader, or an open roll mill, and then vulcanized. The rubber composition can be used in various tire components, and can be particularly suitably used in components that are located at the outer tire surface and required to be weather resistant, such as treads and sidewalls.

The pneumatic tire of the present invention can be formed from the above-described rubber composition by an ordinary method. Specifically, an unvulcanized rubber composition into which the above ingredients are added is extruded and processed according to the shape of a tire component such as a tread, and formed into an unvulcanized tire together with other tire components by an ordinary method using a tire building machine. This unvulcanized tire is then heated and pressed in a vulcanizer. In this way, a tire is prepared.

The pneumatic tire of the present invention is used on passenger vehicles, trucks and buses, two-wheeled vehicles, and the like, and is used as a high-performance tire or the like. The term "high-performance tire" used herein means a tire that is particularly excellent in grip performance, and it is a concept that encompasses racing tires used on competition vehicles.

EXAMPLES

The present invention is specifically described with reference to examples, but the present invention is not limited to these examples.

The chemical agents used in Examples 1 to 4 and Comparative Examples 1 to 5 are listed below.

NR: SIR20
BR: BR150B produced by Ube Industries, Ltd.
Petroleum wax: Ozoace 0355 produced by Nippon Seiro Co., Ltd.
Carnauba wax: TOA-131 produced by To a Kasei Co., Ltd.
*Euglena* wax: wax prepared based on the method described in a book of Kitaoka et al. (entitled "*Euglena*" edited by Shosaburo Kitaoka, Gakkai Shuppan Center (1989)); natural wax derived from microalgae of the genus *Euglena*
Silica: Ultrasil VN3 produced by Degussa
Silane coupling agent: Si266 (bis(3-triethoxysilylpropyl) disulfide) produced by Degussa
Zinc oxide: zinc oxide #1 produced by Mitsui Mining & Smelting Co., Ltd.
Stearic acid: "TSUBAKI" produced by NOF Corporation
Carbon black: Diablack I (ISAF, N220, $N_2SA$: 114 $m^2/g$, DBP: 114 mL/100 g) produced by Mitsubishi Chemical Corporation Antioxidant: Antigene 6C (N-(1,3-dimethylbutyl)-N'-phenyl-p-phenylenediamine) produced by Sumitomo Chemical Co., Ltd.

Sulfur: powder sulfur produced by Tsurumi Chemical Industry Co., Ltd.

Vulcanization accelerator: NOCCELER NS (N-t-butyl-2-benzothiazolylsulfenamide) produced by Ouchi Shinko Chemical Industrial Co., Ltd.

Examples and Comparative Examples

According to the formulation shown in Table 1, materials other than the sulfur and vulcanization accelerator were mixed at 160° C. for 5 minutes by a 1.7-L Banbury mixer to obtain a kneaded mixture. Next, the sulfur and vulcanization accelerator were added to the kneaded mixture, and they were mixed using an open roll mill at 80° C. for 3 minutes to obtain an unvulcanized rubber composition.

The obtained unvulcanized rubber composition was formed into a tread shape, and assembled with other tire components using a tire building machine. The resulting assembly was press-vulcanized at 150° C. for 30 minutes to obtain a test tire (tire size: 195/65R15).

The thus-obtained test tires were evaluated as described below. Table 1 shows the results.
(Static Ozone Test)

Each test tire was mounted to a rim (5J×13). These test tires were placed side by side in an ozone chamber under the conditions of internal pressure 200 kPa, temperature 25° C., and ozone concentration 50 pphm. Then, the number of days until cracking occurred was counted. In the table, ">120 days" indicates that no cracking occurred even after a lapse of 120 days, and "<1 day" indicates that cracking occurred in less than 1 day. The larger the number of days, the longer time the weather resistance can be maintained, indicating better weather resistance.
(Exposure Test)

A wheel was attached to each test tire. These test tires were left outside protected from rain for 3 months. Afterward, the degree of discoloration was checked.
Satisfactory: no discoloration.
Acceptable: slight discoloration.
Poor: severe discoloration.

TABLE 1

| | | Example 1 | Example 2 | Example 3 | Example 4 | Comparative Example 1 | Comparative Example 2 | Comparative Example 3 | Comparative Example 4 | Comparative Example 5 |
|---|---|---|---|---|---|---|---|---|---|---|
| Amount in formulation (part(s) by mass) | NR | 40 | 40 | 40 | 40 | 40 | 40 | 40 | 40 | 40 |
| | BR | 60 | 60 | 60 | 60 | 60 | 60 | 60 | 60 | 60 |
| | Carbon black | 5 | 5 | 5 | 5 | 5 | 5 | 5 | 5 | 5 |
| | Silica | 50 | 50 | 50 | 50 | 50 | 50 | 50 | 50 | 50 |
| | Silane coupling agent | 4 | 4 | 4 | 4 | 4 | 4 | 4 | 4 | 4 |
| | Petroleum wax | — | — | — | — | 1 | 18 | — | — | — |
| | Carnauba wax | — | — | 9 | 3 | — | — | 10 | 18 | — |
| | Euglena wax | 10 | 18 | 9 | 15 | — | — | — | — | — |
| | Antioxidant | 2 | 2 | 2 | 2 | 2 | 2 | 2 | 2 | 2 |
| | Stearic acid | 2 | 2 | 2 | 2 | 2 | 2 | 2 | 2 | 2 |
| | Zinc oxide | 2 | 2 | 2 | 2 | 2 | 2 | 2 | 2 | 2 |
| | Sulfur | 2 | 2 | 2 | 2 | 2 | 2 | 2 | 2 | 2 |
| | Vulcanization accelerator | 1.8 | 1.8 | 1.8 | 1.8 | 1.8 | 1.8 | 1.8 | 1.8 | 1.8 |
| Evaluation results | Static ozone test | 90 days | 100 days | 100 days | >120 days | 21 days | >120 days | 31 days | 68 days | <1 day |
| | Exposure test | Satisfactory | Satisfactory | Satisfactory | Satisfactory | Acceptable | Poor | Satisfactory | Satisfactory | Acceptable |

As shown in the results in Table 1, the examples containing a rubber component and a microalgae-derived natural wax (*Euglena* wax) were able to maintain weather resistance for a long time without damaging the appearance of tires. Further, because the natural wax is derived from microalgae, it is possible to reduce the use of petroleum resources, making the product environmentally friendly. Further, it is easy to obtain its raw materials because various microalgae live in ponds, lakes, brackish waters, seawater, and the like, and cultivation of various microalgae is also actively performed on an industrial scale. Additionally, Example 4 in which the microalgae-derived natural wax was used in combination with carnauba wax exhibited very excellent weather resistance.

In contrast, Comparative Examples 1 and 2 in which petroleum wax was used resulted in poor appearance of tires, compared with the examples. Further, Comparative Examples 3 and 4 in which carnauba wax was used exhibited significantly poor weather resistance, compared with the examples.

(Preparation of Microalgae-Derived Natural Wax)
(Wax Preparation 1)

A wild-type strain of *Euglena gracilis* Z was inoculated into Koren-Hutner medium (300 mL) containing 1% glucose as a carbon source, and cultured for 6 days under the following conditions: temperature 25° C.; initial pH 3.5; shaking at a rate of 120 strokes per minute; air flow of 0.5 L per minute per liter of culture; and light illumination 2000 lux.

Subsequently, the cultured cells were collected by centrifugation, suspended in 100 mL phosphate buffer of pH 6.8, and cultured for 2 days under the following conditions: nitrogen gas flow of 20 mL per minute; room light illumination; and the same shaking conditions as described above.

Then, the cells were disrupted by sonication and extracted with a chloroform-methanol (1:2) solution. The extract was purified by silica gel column chromatography, thereby obtaining 1.5 g of a wax component (wax 1).

(Wax Preparation 2)

Culture was carried out for 6 days under the same conditions as in Preparation 1 except that chloroplast-deficient mutant cells of *Euglena gracilis* Z were used and cultured in the dark.

Thereafter, 2.3 g of a wax component (wax 2) was obtained in the same manner as in Preparation 1.

The composition of the thus-obtained waxes was measured using gas chromatography. Further, in regard to the softening point distribution, the heat flow (mW/g) was measured using a differential scanning calorimeter (DSC) at a temperature increase rate of 5° C./min from −30 to 100° C. Table 2 shows the results.

Further, in regard to the melting point of each wax, the heat flow (mW/g) was measured using a differential scanning calorimeter (DSC) at a temperature increase rate of 5° C./min from −100 to 100° C. The maximum peak temperature of the heat flow curve was defined as a melting point. Table 2 shows the results.

TABLE 2

|  |  | Wax 1 | Wax 2 |
|---|---|---|---|
| Softening point distribution |  | −15 to 66° C. | 15 to 76° C. |
| Melting point (° C.) |  | 58 | 62 |
| Carbon number composition (mol %) | C26 | 12 | 6 |
|  | C27 | 16 | 15 |
|  | C28 | 40 | 42 |
|  | C29 | 11 | 12 |
|  | C30 | 10 | 10 |
|  | C31 or more | 11 | 15 |

Wax 1 showed a smooth DSC heat absorption curve even at temperatures below 0° C., and absorption was observed until about −15° C. This is presumably due to the presence of an unsaturated fatty acid ester having a low melting point. On the other hand, wax 2 showed a small amount of absorption in a low-temperature region, compared with wax 1, and the absorption was shifted to a high-temperature region. Chemical composition analysis also showed that wax 2 contained more components having a larger number of carbon atoms. Nonetheless, DSC absorption in a wide temperature range was observed in both waxes, clearly indicating that these waxes have a wide softening point distribution. It is also clear from their melting points that waxes 1 and 2 are in a solid form at 25° C.

Rubber compositions were prepared from the resulting waxes 1 and 2, and their properties were evaluated. The chemical agents used in Examples 5 and 6 and Comparative Examples 6 to 8 are listed below.

Natural rubber (NR): RSS#3
Polybutadiene (BR): UBEPOL BR150B (cis-1,4 content: 97%, $ML_{1+4}$ (100° C.): 40, Mw/Mn: 3.3) produced by Ube Industries, Ltd.
Silica: Ultrasil VN3 ($N_2SA$: 175 $m^2/g$) produced by EVONIK-DEGUSSA
Carbon black: Niteron #55S ($N_2SA$: 28×10³ $m^2/kg$) produced by Nippon Steel Chemical Carbon Co., Ltd.
Silane coupling agent: Si69 (bis(3-triethoxysilylpropyl) tetrasulfide) produced by EVONIK-DEGUSSA
Petroleum wax: Ozoace 0355 produced by Nippon Seiro Co., Ltd.
Montan wax: produced by To a Kasei Co., Ltd. (melting point: about 68° C.)
Carnauba wax: produced by To a Kasei Co., Ltd. (melting point: about 82° C.)
Antioxidant: NOCRAC 6C (N-(1,3-dimethylbutyl)-N-phenyl-p-phenylenediamine) produced by Ouchi Shinko Chemical Industrial Co., Ltd.
Stearic acid: stearic acid "KIRI" produced by NOF Corporation
Zinc oxide: zinc oxide #2 produced by Mitsui Mining & Smelting Co., Ltd.
Sulfur: powder sulfur produced by Tsurumi Chemical Industry Co., Ltd.
Vulcanization accelerator: NOCCELER NS (N-tert-butyl-2-benzothiazolylsulfenamide) produced by Ouchi Shinko Chemical Industrial Co., Ltd.

Examples and Comparative Examples

According to the formulation shown in Table 3, a 1.7-L Banbury mixer produced by Kobe Steel, Ltd. was charged with chemical agents other than the sulfur and vulcanization accelerator at a filling ratio of 58%, and they were mixed at 80 rpm until reaching a temperature of 140° C. to obtain a kneaded mixture.

Next, the sulfur and vulcanization accelerator were added to the resulting kneaded mixture, and they were mixed using an open roll mill to obtain an unvulcanized rubber composition. Further, the resulting unvulcanized rubber composition was formed into a predetermined size, and press-vulcanized at 150° C. for 20 minutes to obtain a vulcanized rubber composition. Then, a vulcanized rubber slab sheet in size of about 2 mm×130 mm×130 mm was prepared therefrom and used as a test sample.

Further, the thus-obtained unvulcanized rubber composition was formed into a sidewall shape and assembled with other tire components. The resulting assembly was then vulcanized at 170° C. for 15 minutes to prepare a test tire.

The thus-obtained vulcanized rubber slab sheets and test tires were evaluated as described below. Table 3 shows the results.

(Viscoelasticity Test)

The loss tangent (tan δ) of the vulcanized rubber slab sheets was measured using a viscoelasticity spectrometer VES (Iwamoto Seisakusho Co., Ltd.) under the following conditions: temperature 70° C.; initial strain 10%; dynamic strain 2%;

and frequency 10 Hz. The results were expressed as indices of rolling resistance using the following equation, with the rolling resistance index of Comparative Example 6 as 100. The larger the rolling resistance index, the more the rolling resistance is reduced, and in turn the better the fuel economy.
(Rolling resistance index)=(tan δ of Comparative Example 6)/(tan θ of each formulation)×100

(Ozone Resistance Test)

Based on the testing method "Rubber, vulcanized or thermoplastic—Determination of ozone resistance" specified in JIS K 6259, the ozone resistance (weather resistance) was evaluated by observing cracking after testing for 48 hours under the following conditions: ozone concentration 50±5 pphm; temperatures of 0° C. (for low temperatures), 25° C. (for medium temperatures), and 50° C. (for high temperatures); and tensile strain 20±2%. For the evaluation, the number and size of cracks were measured in accordance with the method described in JIS. The alphabets (A, B, and C) indicate the number of cracks. "A" indicates that the number of cracks is small, and "C" indicates that the number of cracks is large. The numbers (1 to 5) indicate the size of a crack. The larger the number, the larger the size of a crack. "No cracks" indicates that no cracking occurred.

(Outdoor Exposure Test: Whitening)

A wheel was attached to each test tire. The test tires were filled with 2.2 atm of air, and left outside (in Kobe City) for 3 months. The degree of discoloration after the three months was visually evaluated.
  Satisfactory: no discoloration.
  Acceptable: slightly whitened.
  Poor: severely whitened.

trast, in the examples in which a microalgae-derived natural wax (wax 1 or wax 2) was used, excellent weather resistance was achieved in a wide temperature range, and fuel economy was also improved. Additionally, no discoloration was observed.

The invention claimed is:

1. A rubber composition for a tire, comprising
    a rubber component and
    a microalgae-derived natural wax.
2. The rubber composition for a tire according to claim 1, wherein the microalga is a microalga of the class Euglenophyceae.
3. The rubber composition for a tire according to claim 1, wherein the microalga is a microalga of the genus *Euglena*.
4. The rubber composition for a tire according to claim 1, wherein the microalgae-derived natural wax is a wax component purified from a culture of the microalga.
5. The rubber composition for a tire according to claim 1, wherein the microalgae-derived natural wax is obtained by culturing the microalga under aerobic conditions and then under anaerobic conditions.
6. A pneumatic tire formed from the rubber composition according to claim 1.
7. The rubber composition for a tire according to claim 1, wherein an amount of the microalgae-derived natural wax is 1 to 20 parts by mass per 100 parts by mass of the rubber component.
8. The rubber composition for a tire according to claim 1, wherein the microalgae-derived natural wax comprises saturated or unsaturated fatty acid esters having a carbon number of 15 to 50.

TABLE 3

| | | Example 5 | Example 6 | Comparative Example 6 | Comparative Example 7 | Comparative Example 8 |
|---|---|---|---|---|---|---|
| Amount in formulation (part(s) by mass) | NR | 60 | 60 | 60 | 60 | 60 |
| | BR | 40 | 40 | 40 | 40 | 40 |
| | Wax 1 | 3 | — | — | — | — |
| | Wax 2 | — | 3 | — | — | — |
| | Petroleum wax | — | — | 3 | 5 | — |
| | Montan wax | — | — | — | — | 1.5 |
| | Carnauba wax | — | — | — | — | 1.5 |
| | Silica | 40 | 40 | 40 | 40 | 40 |
| | Carbon black | 5 | 5 | 5 | 5 | 5 |
| | Silane coupling agent | 3 | 3 | 3 | 3 | 3 |
| | Stearic acid | 2 | 2 | 2 | 2 | 2 |
| | Zinc oxide | 2 | 2 | 2 | 2 | 2 |
| | Antioxidant | 1.5 | 1.5 | 1.5 | 1.5 | 1.5 |
| | Sulfur | 1.8 | 1.8 | 1.8 | 1.8 | 1.8 |
| | Vulcanization accelerator | 1 | 1 | 1 | 1 | 1 |
| Evaluation results | Fuel economy | 103 | 101 | 100 | 98 | 101 |
| | Weather resistance at low temperatures | No cracks | No cracks | A-5 | No cracks | C-5 |
| | Weather resistance at medium temperatures | A-5 | A-2 | B-4 | B-2 | B-5 |
| | Weather resistance at high temperatures | B-5 | B-4 | B-3 | B-2 | B-2 |
| | Exposure test | Satisfactory | Satisfactory | Acceptable | Poor | Acceptable |

In Comparative Example 6 in which 3 parts of petroleum wax were used, sufficient weather resistance was not achieved, and discoloration was observed. Also, Comparative Example 7 in which the amount of petroleum wax used was greater than that in Comparative Example 6 exhibited improved weather resistance compared with Comparative Example 6, but exhibited poor fuel economy and severe discoloration. Further, in Comparative Example 8 in which two types of plant-derived natural waxes were used in combination, although fuel economy was improved, weather resistance was low and discoloration was also observed. In con- 9. The rubber composition for a tire according to claim 1, wherein the microalgae-derived natural wax has a melting point of 40 to 120° C.
10. The rubber composition for a tire according to claim 1, which further comprises a natural wax having a high ratio of polar groups.
11. The rubber composition for a tire according to claim 1, which further comprises carnauba wax.

* * * * *